US008752684B2

(12) United States Patent  (10) Patent No.: US 8,752,684 B2
Pasta et al.  (45) Date of Patent: Jun. 17, 2014

(54) CANTILEVER FOR SUPPORTING LIVE CABLES OF RAILWAY, TROLLEY AND SUBWAY LINES

(75) Inventors: Mario Pasta, Milan (IT); Matteo Porreca, Parma (IT)

(73) Assignee: Sattferr, S.r.l., Parma (IT)

( * ) Notice: Subject to any disclaimer, the term of this patent is extended or adjusted under 35 U.S.C. 154(b) by 122 days.

(21) Appl. No.: 13/321,220

(22) PCT Filed: May 25, 2010

(86) PCT No.: PCT/IB2010/052296
§ 371 (c)(1),
(2), (4) Date: Nov. 18, 2011

(87) PCT Pub. No.: WO2010/136955
PCT Pub. Date: Dec. 2, 2010

(65) Prior Publication Data
US 2012/0061197 A1   Mar. 15, 2012

(30) Foreign Application Priority Data

May 25, 2009   (IT) .............................. BS2009A0092

(51) Int. Cl.
B60M 1/22   (2006.01)
(52) U.S. Cl.
USPC ........................................................... 191/41
(58) Field of Classification Search
USPC .................................................. 191/40–44.1
See application file for complete search history.

(56) References Cited

U.S. PATENT DOCUMENTS 4,679,672 A * 7/1987 Seddon et al. .................. 191/41

FOREIGN PATENT DOCUMENTS

| FR | 2 812 773 A1 | 2/2002 |
| HR | 20 020 348 A2 | 12/2002 |
| JP | 54 118006 A | 9/1979 |
| JP | 2008 201346 A | 9/2008 |

OTHER PUBLICATIONS

International Search Report and Written Opinion for PCT/IB2010/052296, mailed Feb. 3, 2011; ISA/EP.
International Preliminary Report on Patentability (Chapter II of the Patent Cooperation Treaty).

* cited by examiner

*Primary Examiner* — R. J. McCarry, Jr.
(74) *Attorney, Agent, or Firm* — Harness, Dickey & Pierce, PLC (57) ABSTRACT

A cross arm for supporting live railway, trolley and subway lines comprising a cross-member (8) fitted with means of connection to an associable support structure (16), at least a first electric insulator (20) joined to the cross-member (8) and able to support a first live electric cable, electrically insulating it from said cross-member (8). Advantageously, the cross-member (8) comprises a body (24) having a mainly longitudinal (X-X) extension and at least a first attachment portion (28) fitted with a 'U' shaped profile able to form a shaped coupling with said first electric insulator (20). The first attachment portion (28) defines a first seat (32) for the continuous adjustment of the longitudinal position of the electric insulator (20) along the cross-member itself.

18 Claims, 11 Drawing Sheets

CANTILEVER FOR SUPPORTING LIVE CABLES OF RAILWAY, TROLLEY AND SUBWAY LINES

CROSS-REFERENCE TO RELATED APPLICATIONS

This application is a 371 U.S. National Stage of International Application No. PCT/IB2010/052296, filed May 25, 2010, and claims priority to Italian patent application No. BS2009A000092, filed May 25, 2009, the disclosures of which are herein incorporated by reference in their entirety.

The present invention relates to a cantilever for supporting live cables of railway, trolley and subway lines having anyone power supply and anyone overall section of the catenary (Traditional and AV/AC lines).

In particular, it is known of in the art to support the live cables of railway lines by using cantilevers comprising a cross-member to which the insulators of the power supply cables are attached by special anchoring devices; in addition a support arm is usually attached to the cross-member for the registration rod of at least one electric cable with relative insulator.

The solutions of the known art have numerous drawbacks.

First of all, the known cantilevers have many components and are considerable weighty which makes assembly expensive and difficult.

Moreover, on account of the dimensions of the cantilever and of the relative insulators, this is usually mounted on site. Consequently, a certain difficulty is met with in correctly positioning the accessories, especially if the support cross-member has a round section.

In addition, in the systems of the prior art difficulties are encountered in adjusting the position of the insulators which are usually stuck to the circular section cross-member by metal bands and positioned with the aid of a hammer until the desired longitudinal position and angular direction is achieved.

The purpose of the present invention is to resolve the drawbacks mentioned with reference to the prior art.

Such drawbacks and limitations are resolved by a cantilever according to claim 1.

Other embodiments of the cantilever according to the invention are described in the claims below.

Further characteristics and advantages of the present invention will be evident from the description below, made by way of a non-limiting example, of its preferred embodiments, wherein.

The common elements or parts of elements of the embodiments described below will be indicated using the same reference numeral.

According to a general embodiment, the cantilever 4; 400; 600 according to the invention comprises a cross-member 8 fitted with means of connection 12, 100 to an associable support structure, such as for example a pylon 16 or post 160.

In one embodiment, said means of connection 12, 100 comprise at least one support rod 100, attached on one side to the pylon 16 or post 160 and on the other, near the free end of the cross-member 8, and attachments 12 tying the cross-member 8 and the rod 100 to the pylon 16, preferably able to oscillate on a horizontal plane.

The cantilever 4; 400; 600 comprises at least a first electric cable support 20; 420; 620 joined to the cross-member 8 and able to support a first live electric cable.

Advantageously, the cross-member 8 comprises a body having a mainly longitudinal extension X-X and at least a first attachment portion 28 fitted with a shaped profile able to form an anti-rotation shaped coupling with said first electric cable support 20; 420; 620. Anti-rotation shaped coupling is taken to mean that the electric cable support 20; 420; 620 and the attachment portion 28 have such geometric characteristics so as to permit their coupling in a predefined, fixed angular position, with the possibility of axial translation of the support along the cross-member but not of rotation around it. In other words, the electric cable support 20; 420; 620 positions itself and remains blocked in a desired angular position to the cross-member 8, for example in a vertical plane, thanks to its shaped coupling with the attachment portion. Such positioning and angular blocking thereby not requiring the use of special attachment means.

According to a preferred embodiment, said shaped profile is a "U" section. For example, the body 24 comprises a longitudinal rib 25 fitted with first curved edges 26 so as to acquire a 'U' shape.

The first attachment portion 28 defines a first seat 32 for the continuous adjustment of the longitudinal position of the electric cable support 20 along the cross-member itself 8.

According to one embodiment, the first attachment portion 28 comprises a first pair of skids 36 able to guide the longitudinal translation of the electric cable support 20 along the body 24 of the cross-member 8. For example said skids 36 are positioned on said first curved edges 26, on the side opposite the longitudinal rib 25.

The electric cable support 20; 420; 620 comprises a first base 40 counter-shaped in relation to the first attachment portion 28 so as to slide longitudinally along the attachment portion.

According to one embodiment, the first base 40 comprises a first pair of tail-pieces 44 counter-shaped to the first pair of skids 36 to enable the longitudinal sliding of the electric cable support 20; 420; 620 along the cross-member 8 and to prevent a transversal movement of the support 20; 420; 620, perpendicular to the main longitudinal extension X-X of the cross-member 8.

Figure 1:
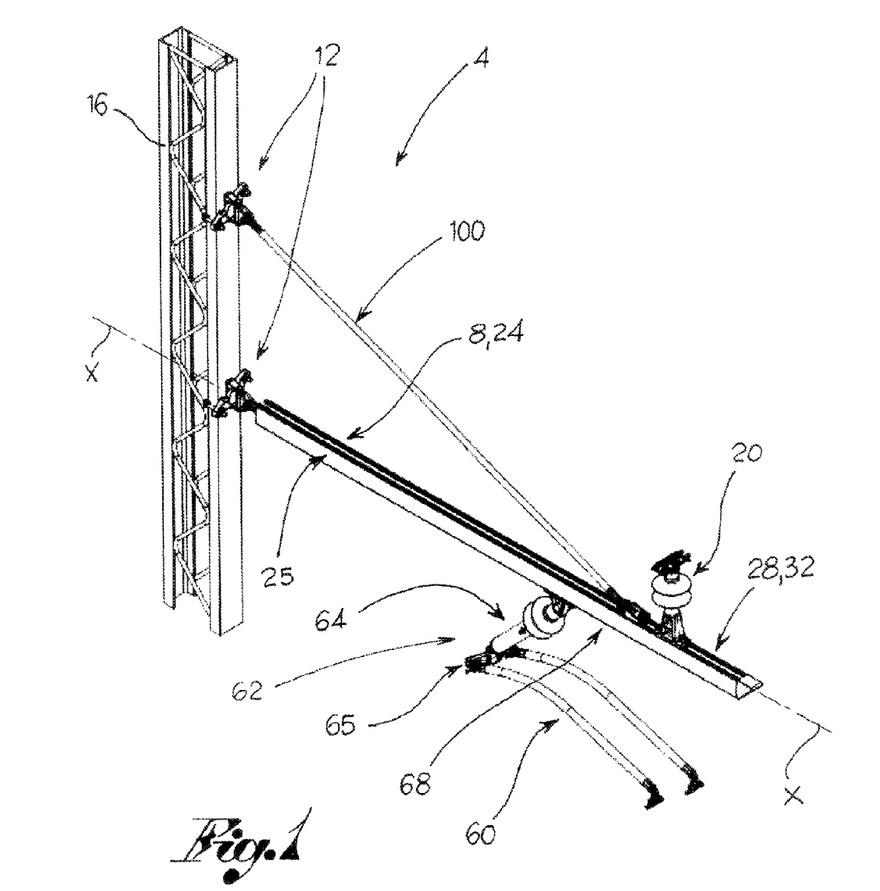
FIG. 1 represents a perspective view of a cantilever for traditional railway lines, according to the present invention.
Figure 2:
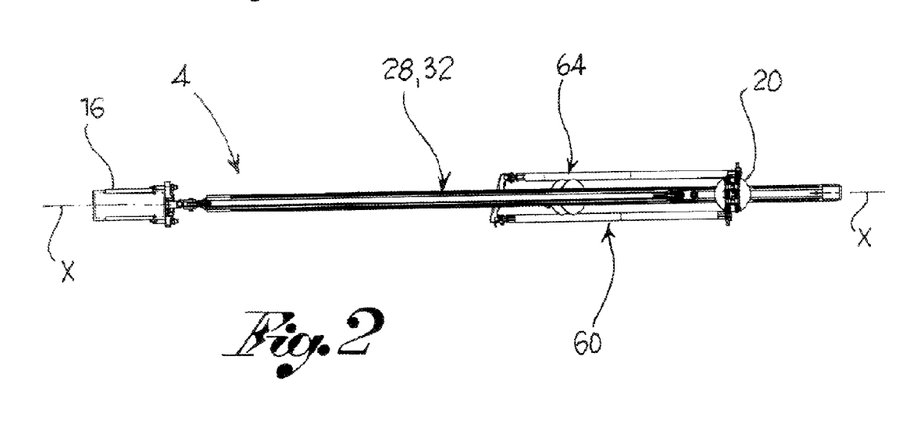
FIG. 2 represents a view from above of the cantilever in FIG. 1.
Figure 3:
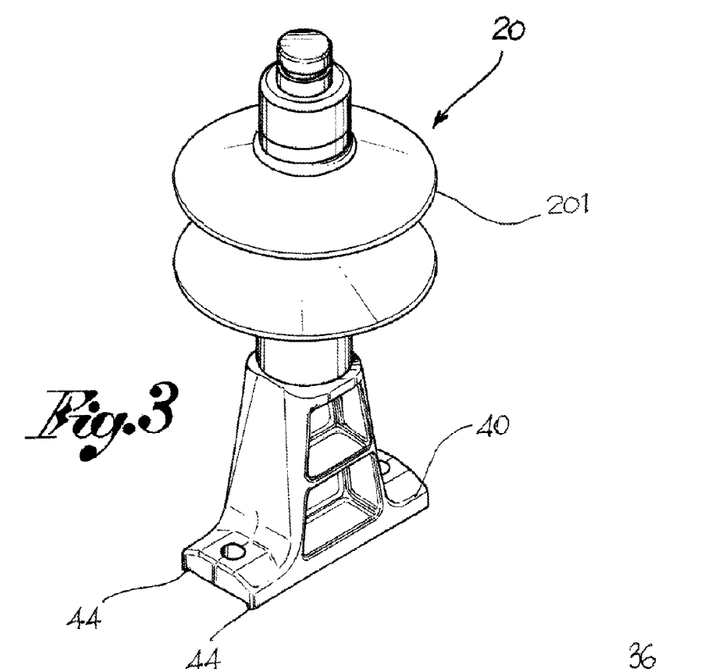
FIG. 3 represents a perspective view of a detail of the cantilever in FIG. 1.
Figure 4:
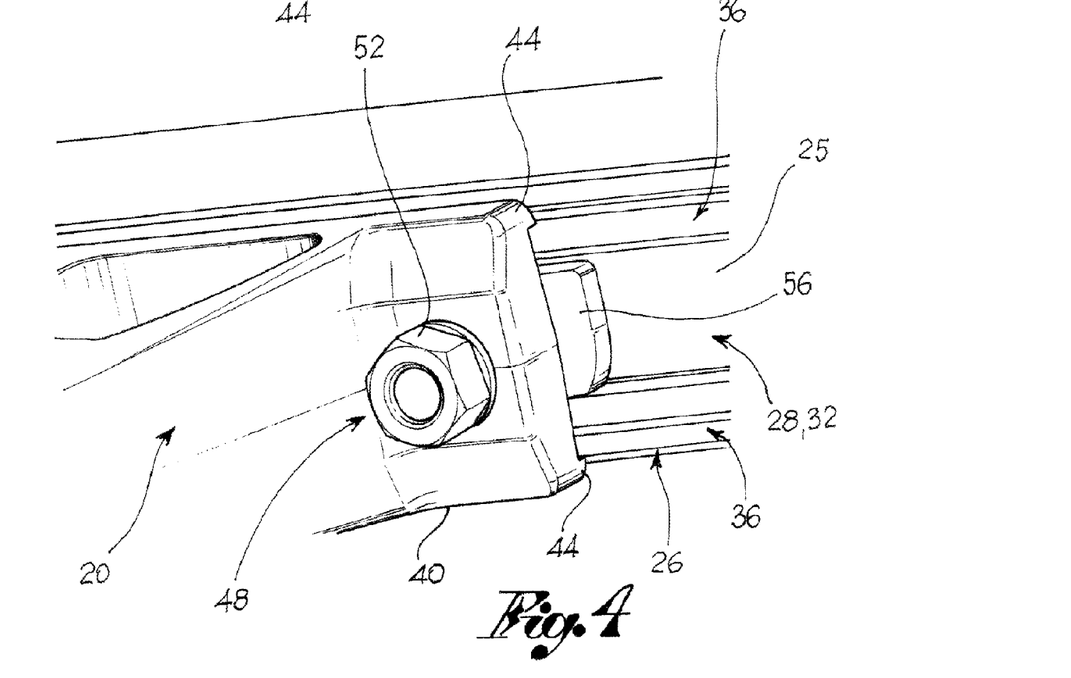
FIGS. 4 and 5 represent perspective views of the detail in FIG. 3 in different assembly configurations on the cantilever of the present invention.
Figure 5:
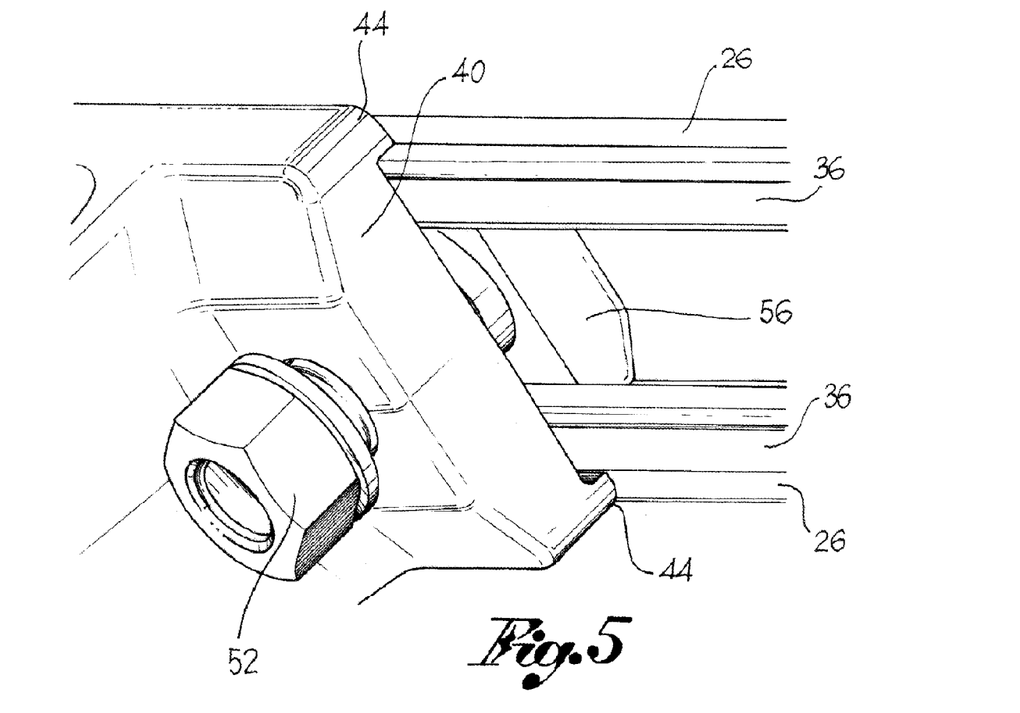
Figure 6:
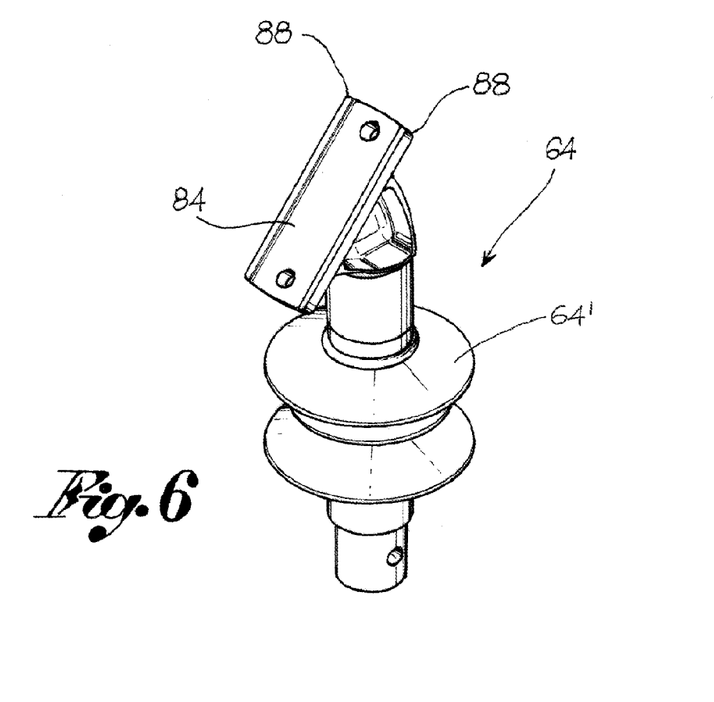
FIG. 6 represents a perspective view of a further detail of the cantilever in FIG. 1.

According to one embodiment, the first base 40 comprises at least one attachment pin 48 with a head 56 and an attachment nut 52. The head 56 is suitable for being inserted inside the first seat 32 according to a first angular orientation (FIG. 4) and is able to block itself inside the seat 32 according to a second angular orientation rotated in relation to the first orientation (FIG. 5).

In other words, the head 56 is insertable in the first seat 32 according to a first angular orientation and can be rotated, by acting on the nut 52, so as to block itself inside the first seat 32 against said first curved edges 26.

In the embodiments shown in FIGS. 1-11, relative to cantilevers for railway lines, a first electric cable support 20, facing upwards, to support the so-called track wire 1, and a second electric cable support 62, facing downwards, to support the so-called contact wire 2 are joined to the cross-member 8.

More specifically, said second electric cable support 62 comprises at least one registration rod 60, able to support the second live electric cable 2, for example by means of a contact wire registration clamp 63, and at least one registration arm 64, which extends downwards from the cross-member 8 and which supports the registration rod 60, for example by means of a joint 65.

According to one embodiment, the body 24 of the cross-member 8 comprises a second attachment portion 68 with a shaped profile suitable to form an anti-rotation shaped coupling with said registration arm 64. Even for said second attachment portion 68, anti-rotation shaped coupling is taken to mean that the registration arm and second attachment portion 68 have such geometric characteristics as to enable their coupling in a predefined, fixed angular position, with the possibility of axial translation of the arm along the cross-member but not of rotation around it.

Advantageously, said second attachment portion 68 has the same section as the first attachment portion 28, for example it has a 'U' shaped profile facing downwards. In other words, the profile of the cross-member 8 is symmetric in relation to a median plane which the longitudinal axis X of the cross-member 8 lies on.

In one embodiment, the second attachment portion 68 defines a second seat 72 for the continuous adjustment of the longitudinal position of the registration arm 64 along the cross-member 8.

Preferably, the second attachment portion 68 comprises a second pair of skids 76 able to guide the longitudinal translation of the registration arm 64 along the body 24 of the cross-member 8. For example the second skids 76 are positioned on second curved edges 80, on the side opposite the longitudinal rib 25.

The registration arm 64 comprises a second base 84 counter-shaped to the second attachment portion 68 so as to slide longitudinally on the second attachment portion 68.

The second base 84 comprises a second pair of tailpieces 88 counter-shaped to the second pair of skids 76 so as to enable the longitudinal sliding of the registration arm along the cross-member 8 and prevent a transversal movement of the arm 64, perpendicular to said cross-member 8.

Preferably, the second base 84 comprises at least one attachment pin 48 with a head 56 and an attachment nut 52. The head 56 is suitable for inserting inside the second seat 72 according to a first angular orientation (FIG. 7) and is able to block itself inside said seat 72 according to a second angular orientation rotated in relation to the first orientation.

Figure 7:
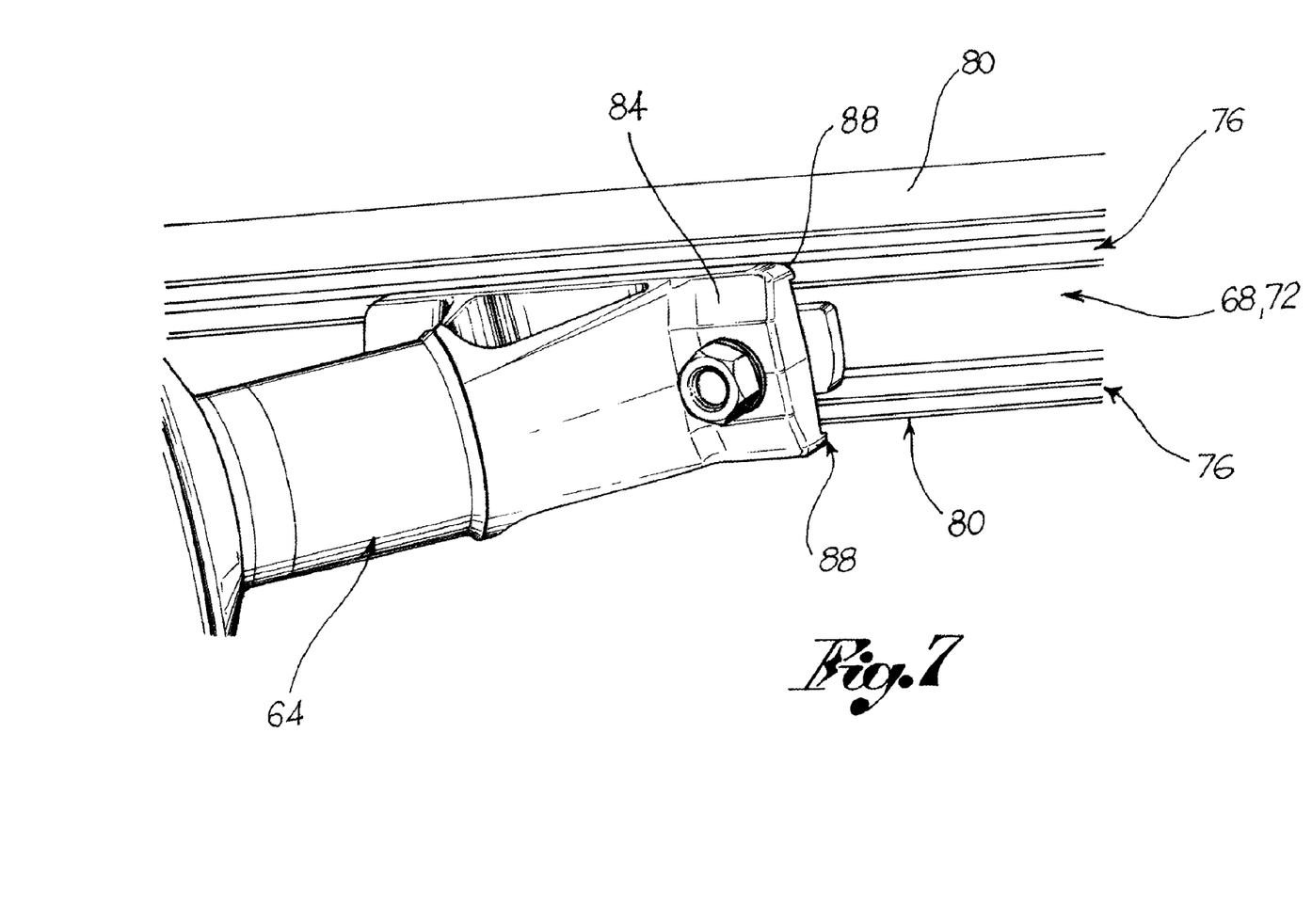
FIG. 7 represents a perspective view of the detail in FIG. 6 in an assembly configuration on the cantilever of the present invention.

In other words, the head 56 is insertable in the second seat 32 according to a first angular orientation and can be rotated, acting on the nut 52, so as to block itself inside the second seat 32 against the second curved edges 80.

Advantageously, the support rod 100 is also attached to the cross-member 8 by means of an anchoring clamp 110 counter-shaped to the first attachment portion 28 so as to be able to slide longitudinally on the first attachment portion 28, for example in the case of adjustment of the point of attachment of the cross-member 8 or of the registration arm itself to the pylon or post 160. For example, the support rod 100 is hinged to the clamp 110 by means of a transversal pin 101. For example, said anchoring clamp 110 has the same sliding and blocking means as the cross-member 8 previously described for the bases 40 and 84 of the electric cable support 20; 420; 620 of the registration arm 64.

Figure 8:
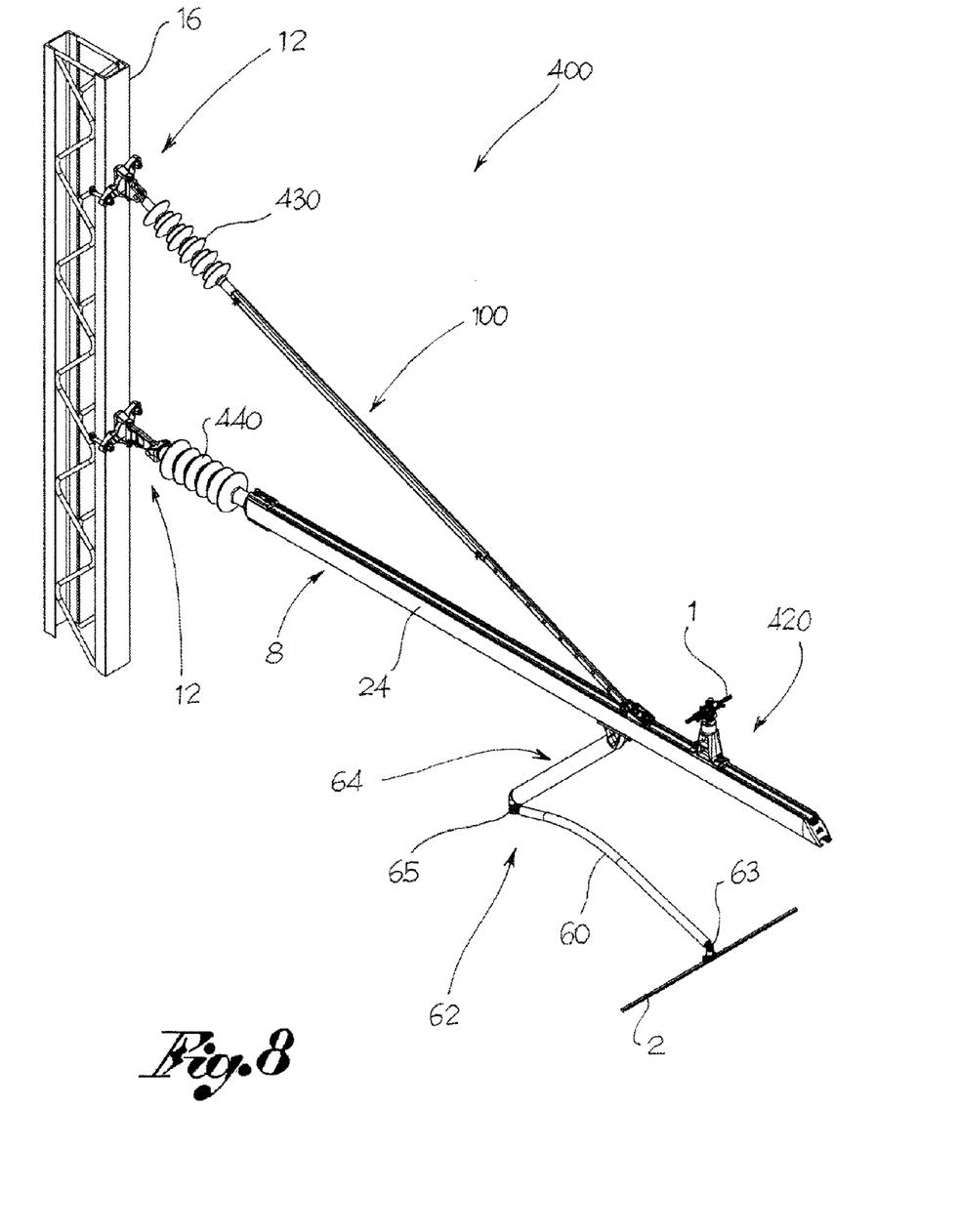
FIG. 8 illustrates, in a perspective view, a cantilever for high speed railway lines, according to the invention.
Figure 9:
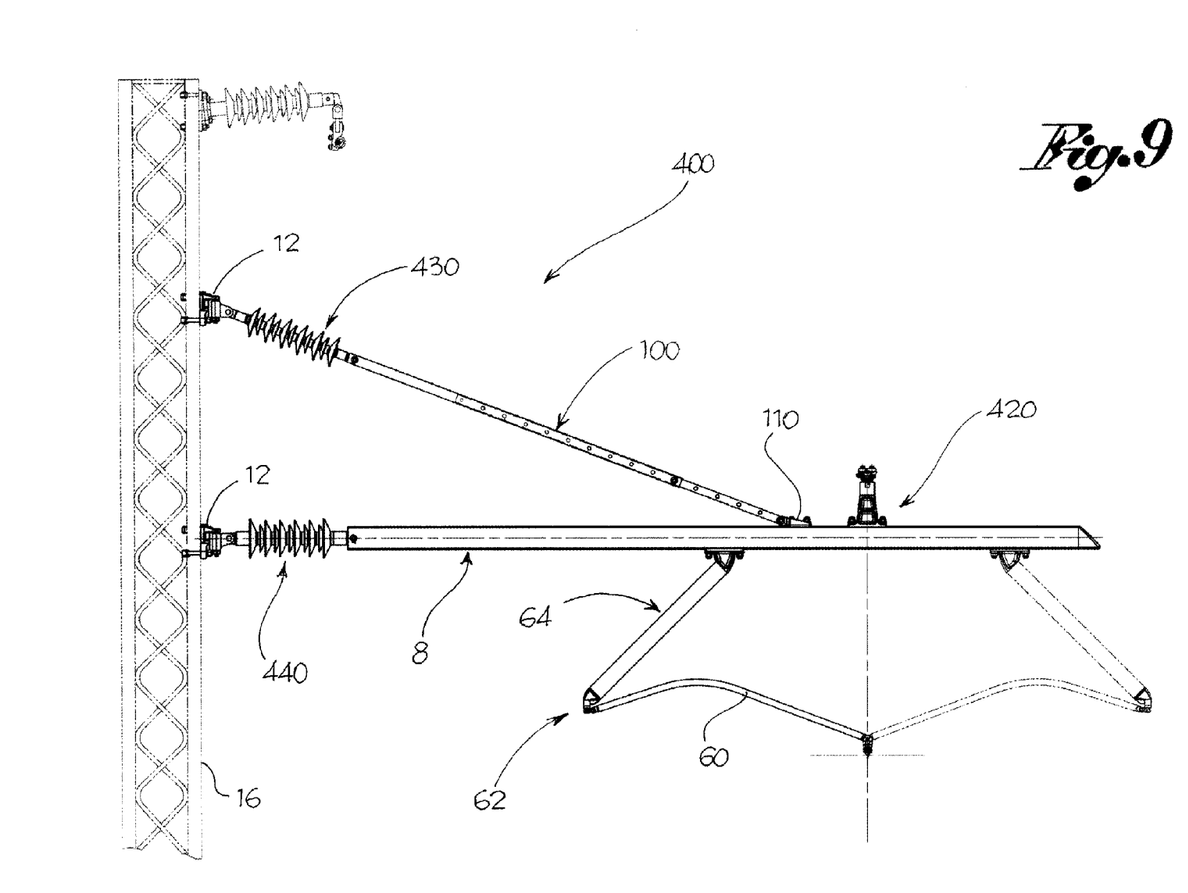
FIG. 9 shows the cantilever of FIG. 8, in a side view.
Figure 10:
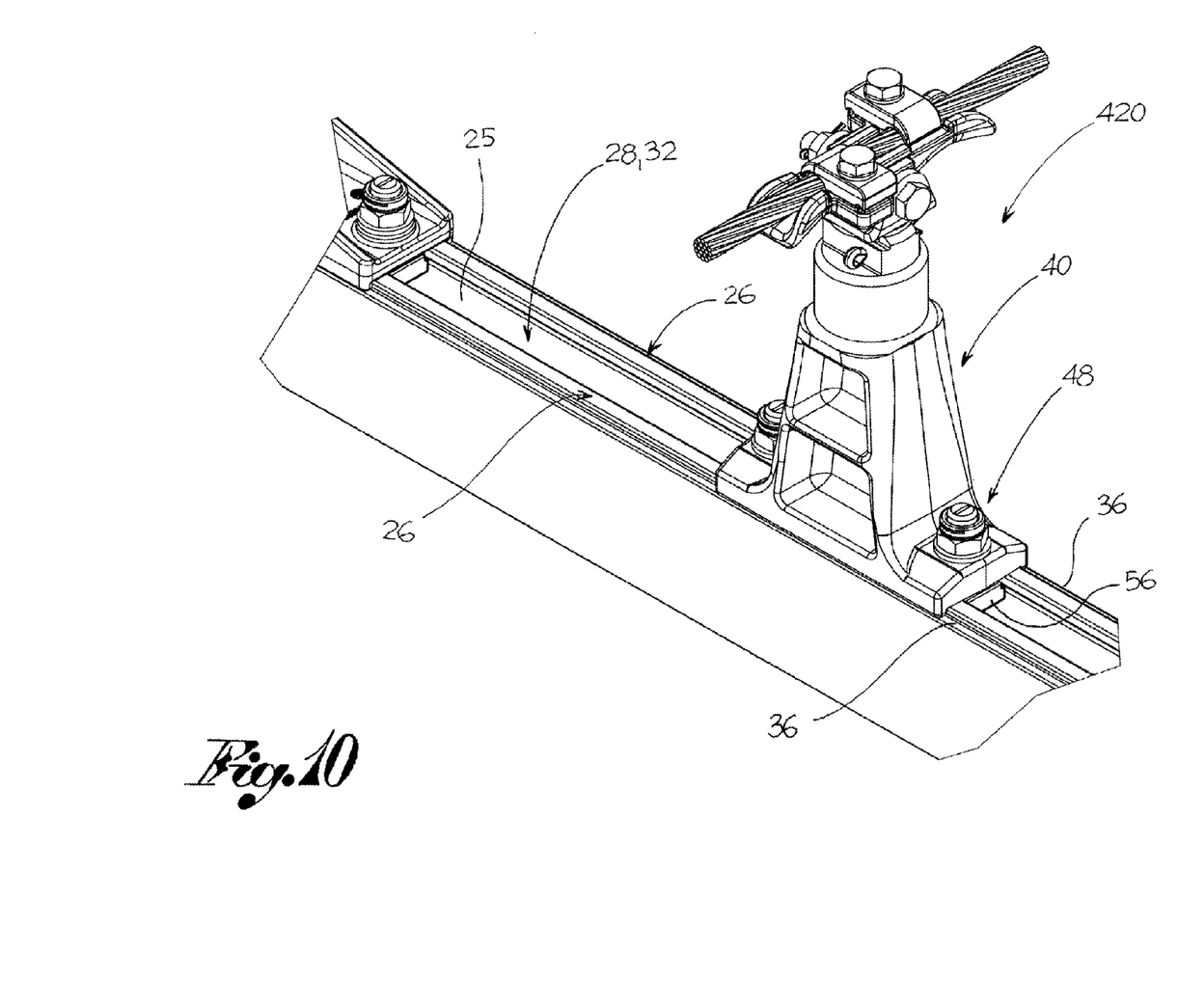
FIG. 10 shows, in a perspective view, an enlarged detail of the cantilever in FIG. 8.
Figure 11:
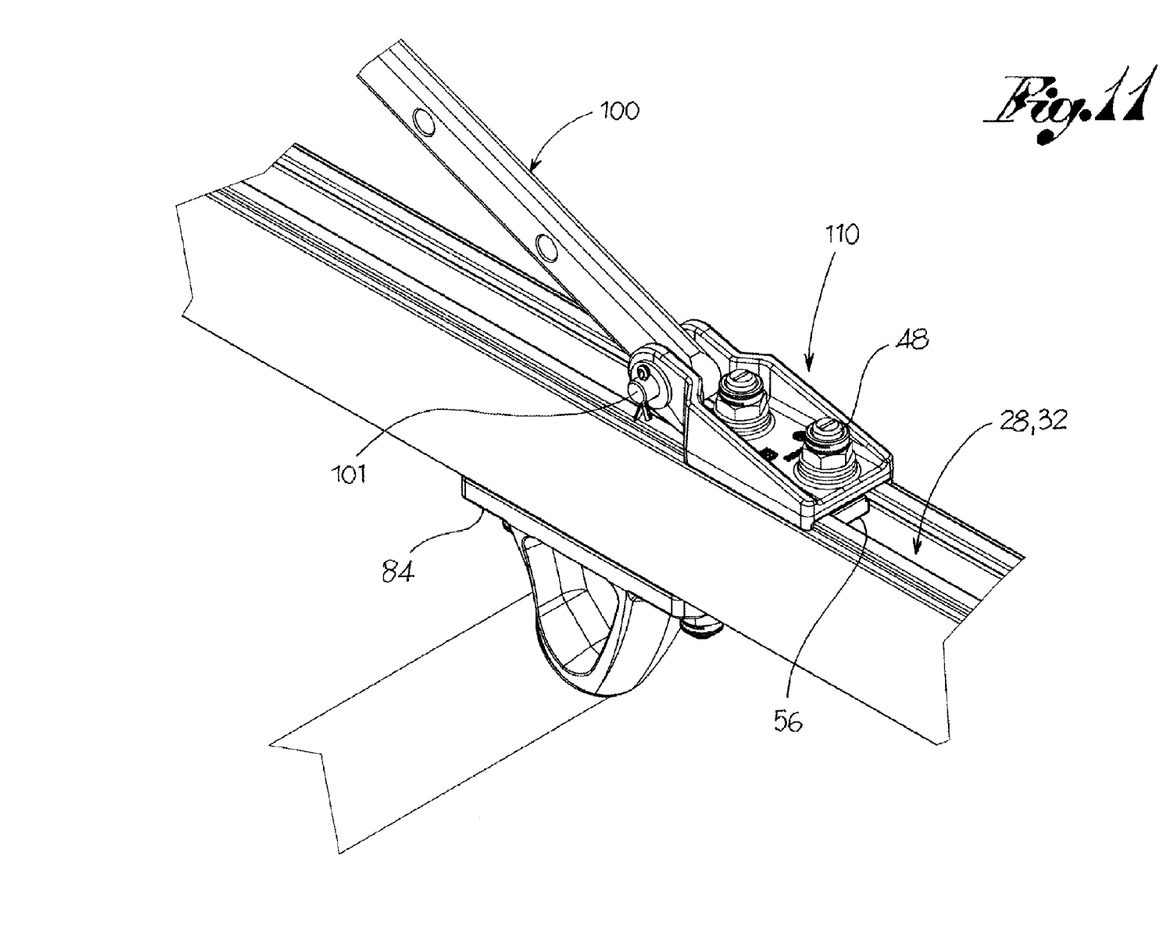
FIG. 11 shows, in a perspective view, another enlarged detail of the cantilever in FIG. 8.
Figure 12:
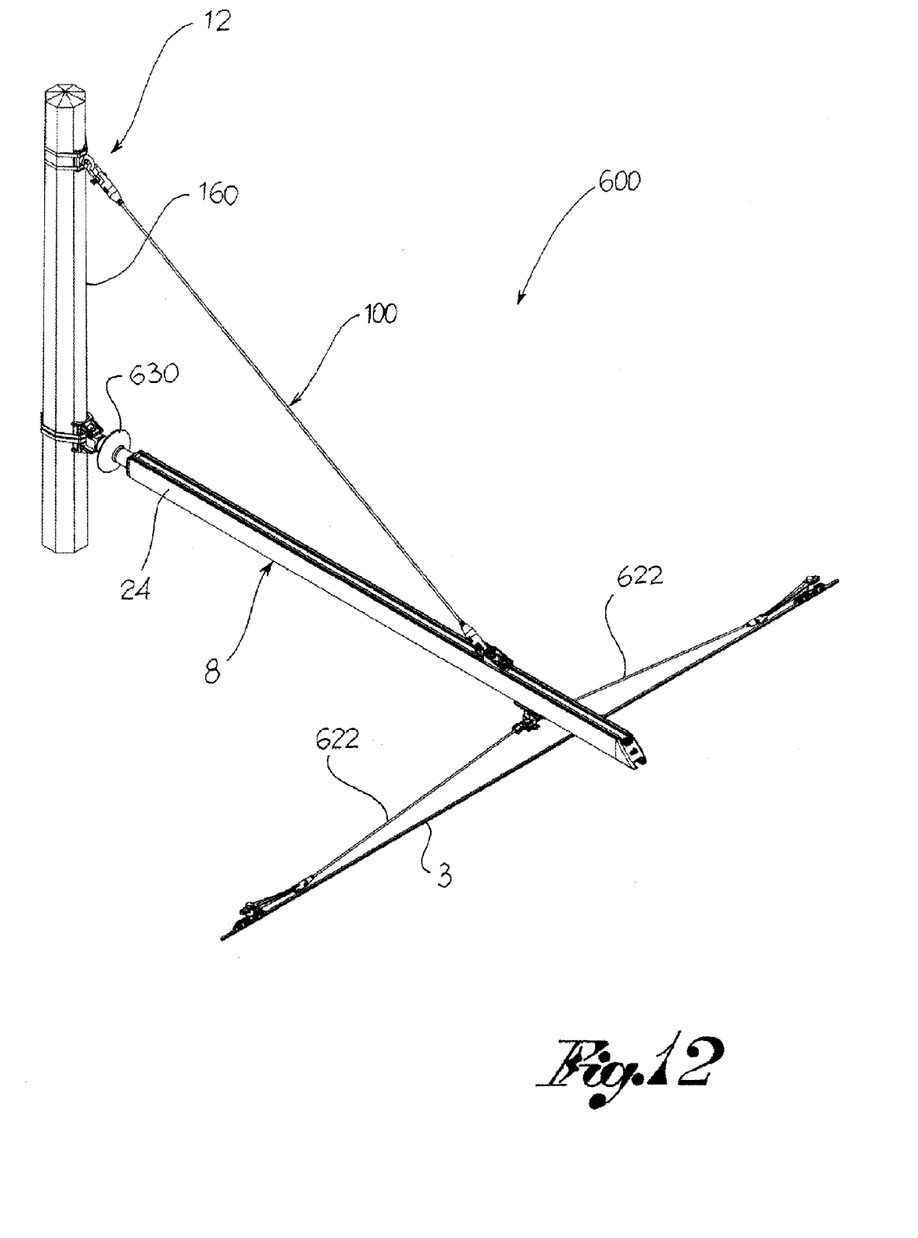
FIG. 12 illustrates, in a perspective view, a cantilever for trolley lines, according to the invention.
Figure 13:
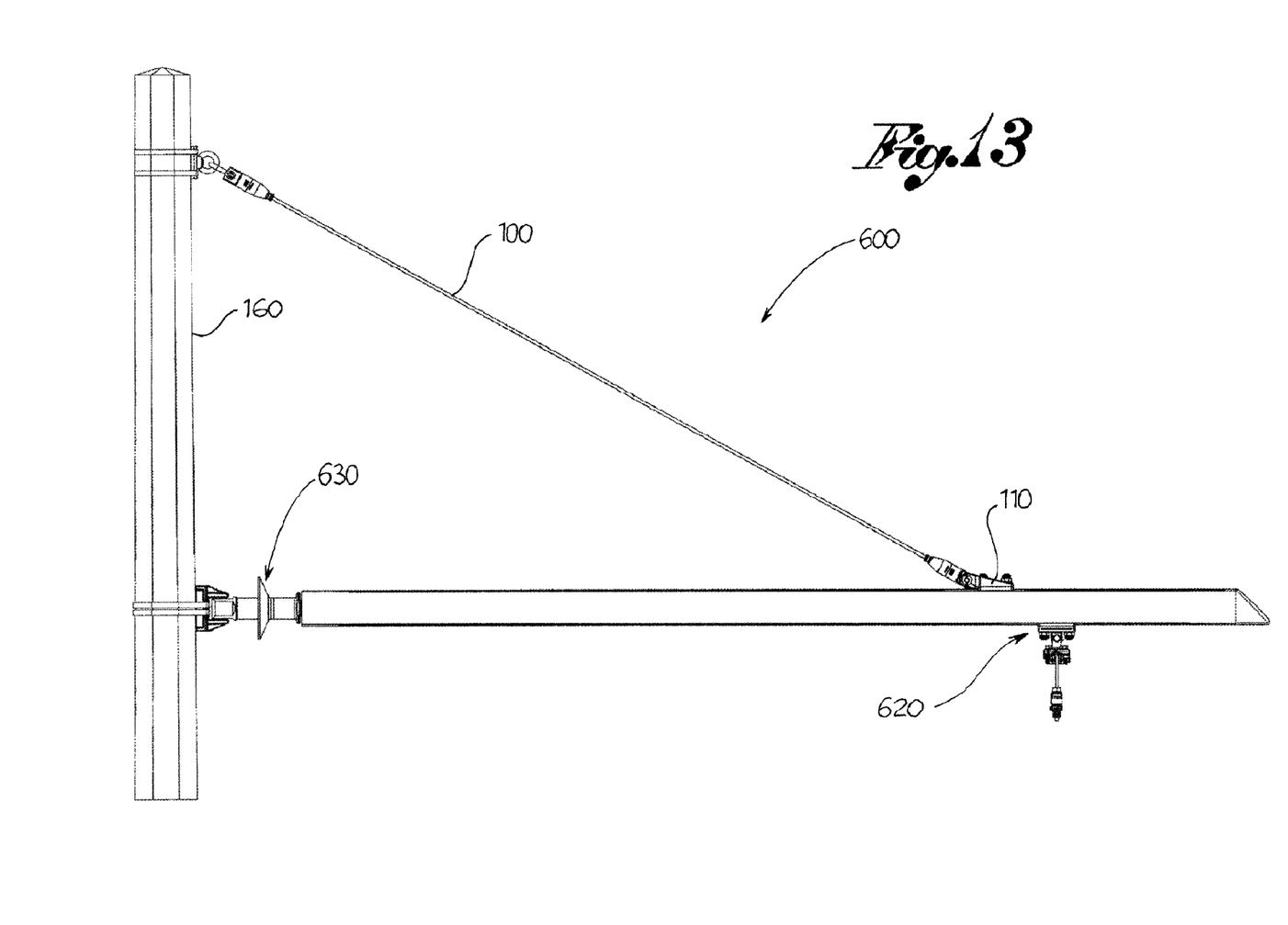
FIG. 13 shows the cross arm of FIG. 12, in a side view.
Figure 14:
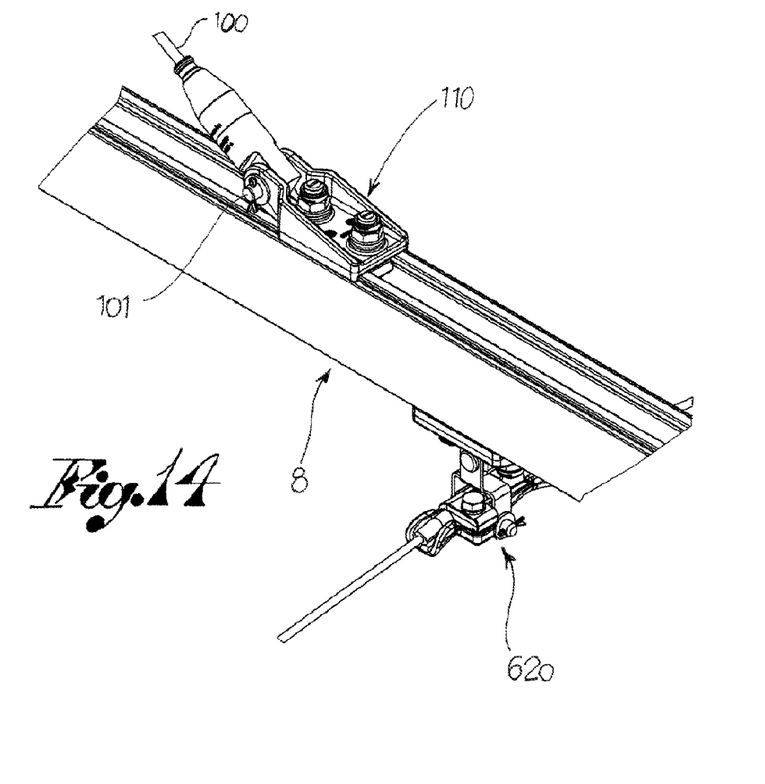
FIG. 14 shows in a perspective view, an enlarged detail of the cantilever in FIG. 12.
Figure 15:
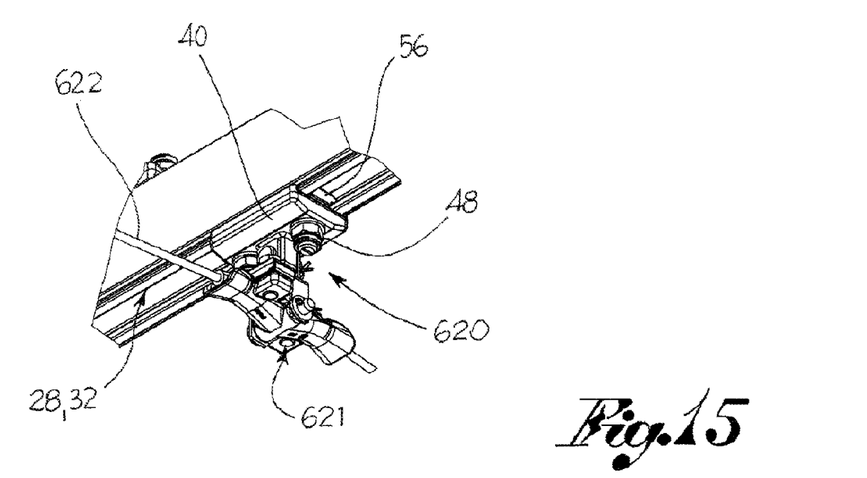
FIG. 15 shows, in a perspective view, another enlarged detail of the cantilever in FIG. 12.

It should be noted that, in one advantageous embodiment illustrated in FIGS. 8 and 9, the support rod 100 is of variable length, for example, telescopic.

In an embodiment illustrated in FIGS. 1-7 and relative for example to a cantilever for traditional 3 KV railway lines, the electric cable support 20 for the track wire comprises a first insulator 201 which extends from the base 40 of the support. At the top of the insulator 201 a jointed suspension clamp is attached for attachment of the track wire.

Advantageously, again in the case of the cross arm for 3 KV cables, the registration arm 64 is composed of a second insulator 64'.

Preferably, the insulators 201, 64' are each made in one piece. According to one embodiment, the insulators are made by moulding and comprise a fibreglass core cladded with an insulating portion in rubber and aluminium terminals.

In the case of high speed railway lines, for example 25 KV, electric insulation is provided between the support pylon 16 and the cantilever 400 instead of between the electricity cables and the cross-member 8.

In particular, a first insulator 430 is placed between the pylon 16 and the support rod 100, while a second insulator 440 is placed between the pylon and the cross-member 8. Said first and second insulators 430, 440 are coaxial to the support rod 100 and to the cross-member 8 respectively and are attached to the pylon by means of respective jointed attachments 12, able to permit oscillation on horizontal planes.

The positioning of the insulators in line with the cross-member and the support rod, near the pylon, rather than on the electric cable support and on the registration arm, makes it possible to prevent dangerous momentum on the cross-member caused by the radial loads of the insulators. In the case of 25 KV cables in fact, the insulators are considerably longer and heavier than the traditional 3 KV cables.

In an embodiment relative to trolley lines shown in FIGS. 12-15, the cantilever 600 differs from the cantilevers described above in that at least one electric cable support 620 is positioned along the cross-member 8, comprising an attachment base 40 to the lower profiled side 28 of the cross-member 8, and a clamp 621 attached to said base 40 and bearing a transversal support cable 622 bearing the electric power supply cable 3. Said support cable 622 is made in an insulating material.

The cross-member 8 is supported by at least one support rod 100 attached on one side to the post 160 and on the other to the cross-member 8, near the electric cable support 620.

The section of the cross-member 8, method of sliding and attaching the support 420 and the anchoring clamp 110 to the cross-member of the support rod 100 are the same as those described above.

In one embodiment, the support rod 100 is made in an insulating material too.

In addition, between the post 160 and the cross-member 8 a further insulator 630 is inserted.

It should be noted, that in all the embodiments described, the geometry of the cantilever is always of the triangle rectangle triangular type, that is, it is formed of a horizontal cross-member, bearing the supports for the power supply cables, and of at least one inclined support rod. This geometrical feature is particularly advantageous in that it enables adjustment of the position of the track wire and of the contact wire merely by shifting the relative support along the cross member. The latter, on the contrary, like the support rod, remains in the same position.

Preferably, the cantilever 4 is made of aluminium or aluminium alloy.

As may be appreciated from the above, the cantilever according to the invention makes it possible to overcome the drawbacks mentioned of in relation to the prior art.

In fact, the positioning of the electric cable supports is always correct and fast, in that it requires only the loosening of the bolts or screws before positioning correctly, making the supports slide along the respective skids.

In addition, due to the shaped coupling with the respective attachment portions of the cantilever, the cable supports are always correctly orientated angularly in relation to the cross-member; in other words the fitter does not have to worry about the angular orientation of the supports as happens in the solutions of the prior art having cross-members of a circular section.

The shaped coupling comprising curved edges in fact forms an undercut and also makes it possible to slide the support without having to support it on the cantilever. This makes assembly of the cantilever and adjustment of the supports faster and safer.

In addition, the cantilever of the present invention can be pre-assembled inasmuch as lighter than the cross arms of the prior art: in fact it is made of aluminium.

Advantageously, the cantilever of the present invention comprises a smaller number of parts than the cantilevers of the prior art: in fact the support arm for the registration rod, used in the cantilevers of the prior art, is replaced directly by the insulator.

In other words, unlike the solutions of the prior art, it does not envisage the use of an additional support arm for the rod; such support function is performed instead by the second electric insulator.

Advantageously, the insulators are made in a single moulded piece and are much lighter in that they have a fibreglass core and aluminium terminals.

Advantageously, in one embodiment the insulators of the present invention are positioned downstream of the support pylon: this way servicing operations are simplified.

The 'U' shaped profile of the body of the cross-member is able to resist considerable mechanical loads (both for high speed lines with few curves, and for peripheral, more sinuous lines): in fact the closed profile is more resistant.

A person skilled in the art may make numerous modifications and adjustments to the cross arms described above so as to satisfy contingent and specific requirements while remaining within the sphere of protection of the invention as defined by the following claims.

The invention claimed is:

1. A cantilever for supporting live cables of railway lines, trolley and subway lines, comprising
    a horizontal cross-member fitted with a connection to an associable vertical pylon or post, and bearing all the electric cable supports of the cantilever;
    at least one inclined support rod of the cross-member having one side attached to the pylon or post and the other attached to the cross-member, near to a free end of the cross-member;
    at least a first electric cable support joined to the cross-member and able to support a first live electric cable, electrically insulating it from said cross-member, wherein the cross-member comprises a body having a mainly longitudinal extension (X-X) and at least a first attachment portion fitted with a shaped profile able to form an anti-rotation shaped coupling with said first electric cable support, the first attachment portion defining a first seat for continuous adjustment of a longitudinal position of the electric cable support along the cross-member; and
    at least one registration rod able to support a second live electric cable and a registration arm, which connect said registration rod to the cross-member, wherein the body of the cross-member comprises a second attachment portion fitted with a 'U' section able to form a shaped coupling with the registration arm, the second attachment portion forming a second seat for the continuous adjustment of the longitudinal position of the registration arm along the cross-member itself.

2. The cantilever according to claim 1, wherein said shaped profile of the attachment portion is a 'U' section.

3. The cantilever according to claim 1, wherein the first attachment portion comprises a first pair of skids able to guide the longitudinal translation of the first electric cable support along the body of the cross-member.

4. The cantilever according to claim 1, wherein the first electric cable support comprises a first base counter-shaped in relation to the first attachment portion so as to slide longitudinally along the first attachment portion.

5. The cantilever according to claim 4, wherein the first base comprises a first pair of tail-pieces counter-shaped in relation to the first pair of skids so as to enable the longitudinal sliding of the first cable support along the cross-member and to prevent any transversal movement of the first cable support, perpendicular to the mainly longitudinal extension (X-X) of the cross-member.

6. The cantilever according to claim 4, wherein the first base comprises at least one attachment pin with a head and an attachment nut, the head being able to be inserted inside the first seat according to a first orientation and able to block itself inside the first seat according to a second orientation, rotated in relation to the first.

7. The cantilever according to claim 1, wherein the second attachment portion comprises a second pair of skids able to guide the translation of the registration arm along the body of the cross-member.

8. The cantilever according to claim 7, wherein the registration arm comprises a second base counter-shaped in relation to the second attachment portion so as to slide longitudinally along the second attachment portion.

9. The cantilever according to claim 8, wherein the second base comprises a second pair of tail-pieces counter-shaped in relation to the second pair of skids so as to enable the longitudinal sliding of the registration arm along the cross-member and to prevent any transversal movement of the registration arm, perpendicularly to said cross-member.

10. The cantilever according to claim 8, wherein the second base comprises at least one attachment pin with a head and an attachment nut, the head being able to be inserted inside the second seat according to a first orientation and able to block itself inside the second seat according to a second orientation, rotated in relation to the first orientation.

11. The cantilever according to claim 1, wherein the first electric cable support comprises a insulator element.

12. The cantilever according to claim 11, wherein said insulators are each made in one piece.

13. The cantilever according to claim 1, wherein the registration arm is realized with a second insulator element.

14. The cantilever according to claim 13, wherein at least a registration rod is attached to the cross-member by said second insulator which support the registration rod connecting it directly to the cross-member and electrical insulating it from the cross-member.

15. The cantilever according to claim 13, wherein the second insulator, on the side opposite the second base, comprises a pivot at which the registration rod is supported.

16. The cantilever according to claim 1, wherein said insulators are made by moulding and comprise a fibreglass core covered in an insulating portion in rubber.

17. The cantilever according to claim 1, wherein at least an insulating element is located between the cross-member and the support structure.

18. The cantilever according to claim 1, wherein said cantilever is made in aluminium.

* * * * *